United States Patent [19]

Wolter

[11] 4,283,851
[45] Aug. 18, 1981

[54] SCISSOR-TYPE SHEAR, ESPECIALLY A CABLE CUTTER

[75] Inventor: Eckhard Wolter, Dürmentigen, Fed. Rep. of Germany

[73] Assignee: Baudat E. Wolter KG, Dürmentingen, Fed. Rep. of Germany

[21] Appl. No.: 97,970

[22] Filed: Nov. 28, 1979

[30] Foreign Application Priority Data

Mar. 17, 1979 [DE] Fed. Rep. of Germany ....... 2910544

[51] Int. Cl.³ .......................................... B26B 15/00
[52] U.S. Cl. ..................................... 30/134; 30/228; 30/266
[58] Field of Search ................... 30/92, 134, 135, 228, 30/245, 266, 267

[56] References Cited

U.S. PATENT DOCUMENTS

| 1,467,262 | 9/1923 | Barker | 30/245 X |
| 3,006,072 | 10/1961 | Nicoletta | 30/266 |
| 3,039,189 | 6/1962 | McBerty | 30/228 X |
| 3,059,334 | 10/1962 | Joers | 30/228 |
| 3,267,573 | 8/1966 | Hill | 30/228 |
| 3,893,237 | 7/1975 | Jahnke | 30/228 |
| 3,906,631 | 9/1975 | Brunosson | 30/267 |

Primary Examiner—Jimmy C. Peters
Attorney, Agent, or Firm—Montague & Ross

[57] ABSTRACT

A shear or like scissor-type tool, especially an electric cable cutter, having two blades at least one of which is movable and a pivot about which this blade moves in a scissor-type action. The device is provided with a mechanism for increasing the pressing force at the blade pivot in response to the instantaneous cutting resistance with this pressing force on the blades being relieved upon or prior to opening of the cutter.

20 Claims, 7 Drawing Figures

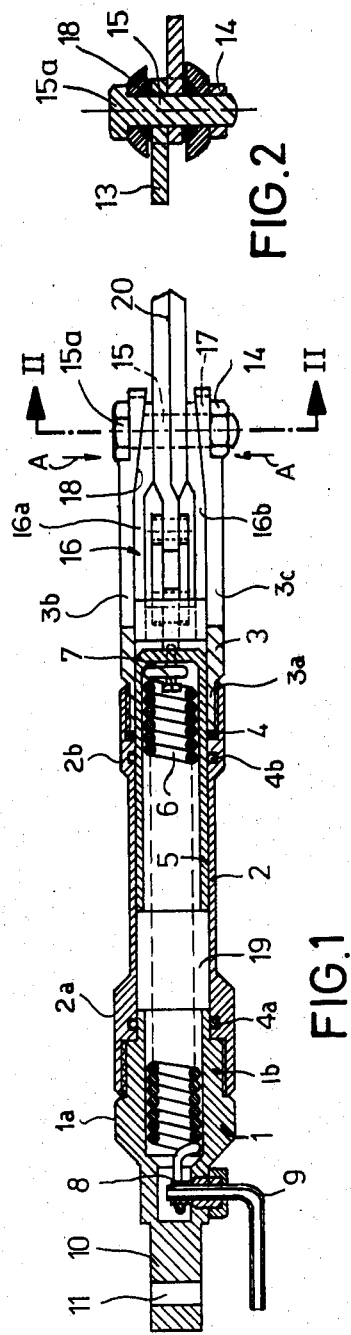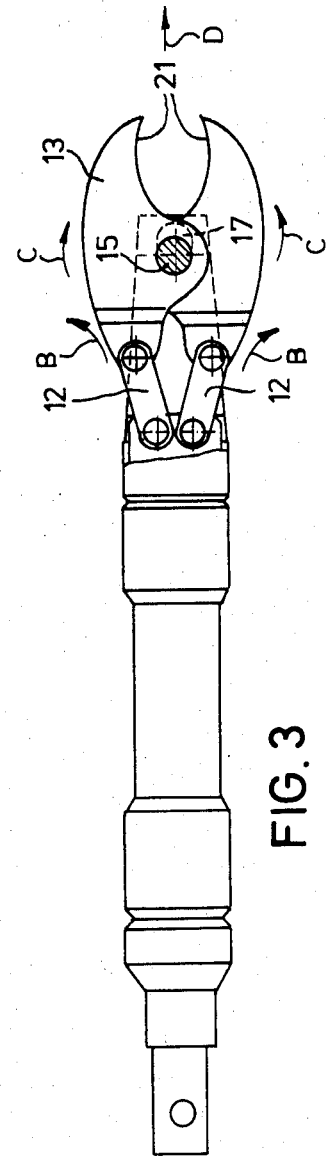
FIG.2
FIG.1
FIG.3

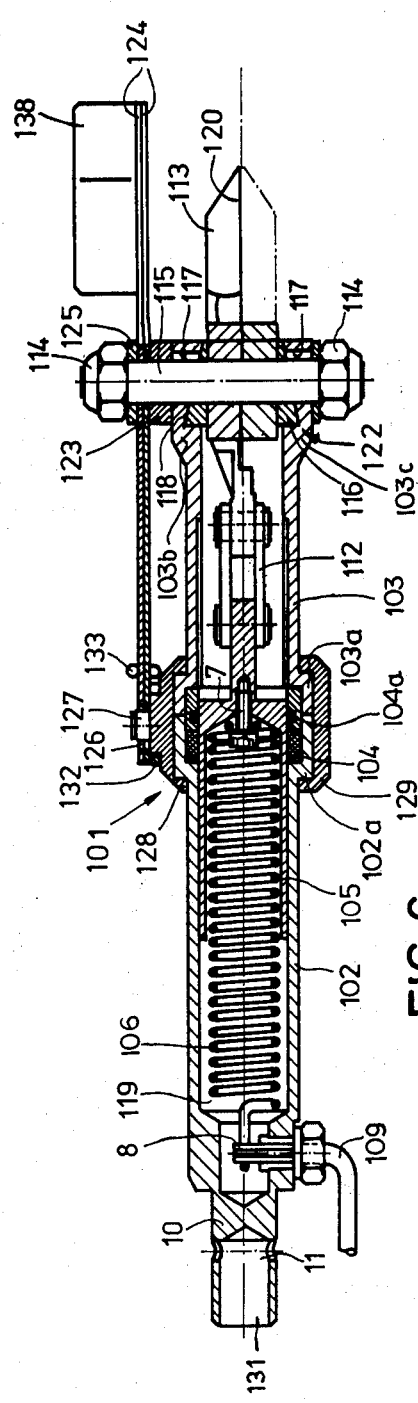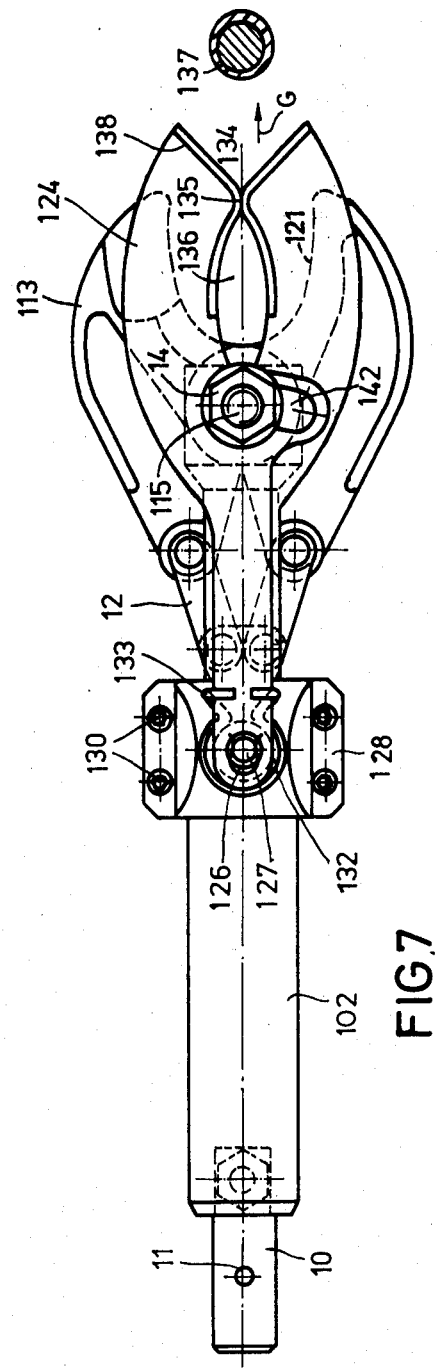
FIG.6
FIG.7

SCISSOR-TYPE SHEAR, ESPECIALLY A CABLE CUTTER

FIELD OF THE INVENTION

My present invention relates to scissor-type power-actuated tools, i.e. shears, and especially to electrical cable cutters and, more particularly, to a power-actuated cable cutter in which at least one movable blade is swingable about a pivot axis relative to the other blade, but wherein more commonly both blades are pivotal about a common axis.

BACKGROUND OF THE INVENTION

Power-operated scissor-type tools, such as shears, and electrical cable cutters in particular, commonly have a pair of blades which are relatively displaceable about a common axis formed by a pivot traversing both blades with one blade lying against the other at the pivot so that the cutting edges of the two blades lie in parallel planes and engage a workpiece, such as an electrical cable, with a shearing action. The blades meet and pass at a contact plane common to them both and which ultimately is the plane of the cut through the workpiece.

In order to ensure a clean and straight cut through the workpiece, the cutter blades must be held together with force to resist the tendency of the cutting edges to move out of the aforementioned cutting plane and thereby clamp the workpiece or pieces thereof between the blades, transform the cut into an irregular tear, or both. Furthermore, since the forces applied to the blade lie out of the cutting plane, the blades may be bent, twisted or damaged and the entire device rendered unsuitable.

Consequently, the pressing force holding the blades against one another must be considerable to avoid these disadvantages. However, if this pressing force is excessive, friction between the blades causes them to block and renders the device inoperative.

Hand-held tools of this type, such as shears or scissors, are commonly provided with bolts, screws and the like enabling adjustment of the pressing force. However, such devices are seldom fully satisfactory even for hand tools because frequently the pressing force is insufficient for the cutting of heavy articles or is so great that the tool cannot be readily manipulated.

With conventional power-operated shears, such as electrical cable cutters, the tendency is to increase the pressing force to a maximum which calls for double-acting cylinders so that the necessary opening force can be generated against the friction effect described. This is disadvantageous when, as is the case of many cable cutters, the force-applying means is a foot-operated or hand-operated pump since the latter must be actuated for the opening stroke as well as the closing stroke in a time-consuming series of operations. Furthermore, the use of high pressing forces at all times and both during the opening and closing strokes increases the wear of the blades and requires frequent replacement thereof.

OBJECTS OF THE INVENTION

It is, therefore, the principal object of the present invention to provide a power-operated shear or other scissor-type tool, e.g. a cable cutter, which is free from the disadvantages of earlier devices and which can be operated more efficiently with reduced wear.

Another object of the invention is to provide a cable cutter or other tool of the type described which does not require the application of significant opening force but which nevertheless is not subject to dislocation of the cutting edges or blades even when heavy workpieces are to be cut.

Yet a further object of this invention is to provide a tool of the character described which is capable of performing cleaner cuts, even through heavy or cut-resistant workpieces without danger to the tool or to the workpiece, but which can be operated efficiently and economically with a long useful life.

SUMMARY OF THE INVENTION

These objects and others which will become apparent hereinafter are attained, in accordance with the present invention, in a shear-type tool having a pair of blades at least one of which is swingable relative to the other about a pivot transverse to a cutting plane defined by the blade motion and wherein one of the blades overlies the other, in which even from the beginning of a cutting operation a mechanism increases the pressing force between the blades, i.e. transverse to this plane and generally parallel to the aforementioned axis so that this pressing force will increase in accordance with the resistance of the workpiece to cutting but will be reduced practically to a negligible value upon opening of the cutter, i.e. with reverse movement of the movable blade.

Naturally, both of the blades can be movable within the purview of the present invention.

According to the invention, therefore, a pressing mechanism or means is provided which responds to the instantaneous cutting resistance and applies a proportional pressing force but which relieves the pressing force during the opening of the cutter.

According to the invention, the force generated for the actuation of the cutter is communicated by the pressing mechanism to the blades, i.e. is transformed at least in part to a pressing force acting parallel to the pivot axis of the blades to urge them toward one another with a force proportional to the cutting force.

For example, since the force perpendicular to the cutting plane holding the blades against one another is a function of the cutting force, the blades can be considered to lie against each other during the cutting operation with sufficient force to totally preclude any entrapment of material between the blades and any cutting irregularities. The cutting efficiency is thereby increased and the cleanness of the cut and the smoothness thereof are improved. Since the pressing force is reduced prior to and/or during the blade-opening operation, only a minimum of frictional resistance is observed during this phase of the operation so that the opening force is minimal and can be obtained by a restoring spring without the need for double-acting cylinders or the like. The wear of the cutter is thereby reduced.

According to the invention, the pressing mechanism is provided in the region of the blade pivot and acts directly upon one blade or acts on one blade via an intermediate member, although when the action is effected via the bolt or pivot pin, the latter can constitute a force-transmitting member drawing the second blade toward the first. The pressing mechanism can include a curved or linear cam surface with the angle of attack being selected to apply the appropriate pressing force for a given actuating force or actuating pressure in the power cylinder of the cutter.

For example, a slidable member can be wedged between abutments formed along the axis of the pivot to drive the blades together, a complementary inclined surface axially bearing upon the pivot. The pivot can be shiftable by a fluid actuator relative to a housing portion formed with a wedging surface and the displacement of the pivot can be limited by abutments which can form a lost-motion connection between the wedging or camming and the actuator.

When lost motion in this sense is provided, it is possible to obtain the initial application of an increased pressing force prior to blade closure and a relief of this pressing force prior to the commencement of blade opening. When the abutment is engaged after an initial movement of the pivot during which the pressing force is initially applied, the pressing force increases generally proportionally to the cutting force.

When the wedging, inclined or tapering surfaces have their taper or inclination below the self-blocking angle, the camming member can be withdrawn with a minimum of force to reduce the pressing force before the blades open.

According to the invention, moreover, the cam carrier can be a sleeve coaxial with the housing and formed with a slot opening forwardly and defining a pair of shanks between which the blades are received. The free ends of these shanks can be formed with longitudinally extending elongated openings forming the abutments for the pivot which can traverse the openings and hence constituting the lost-motion device with the pivot. The portions of the shanks flanking the pivot can constitute the tapering or inclined surfaces forming the cam or wedge which can be flat or conical as desired.

According to yet another feature of the invention, the actuator can be constituted by a piston which is shiftable in a cylinder and can be displaced therein by hydraulic pressure developed by a foot, manual or motorized pump, a single hydraulic connection serving to connect the cutter to the pressure source. The blades can be coupled with the piston by toggle levers so that displacement of the piston will initially result in shifting of the blade pivot until one of the abutments is engaged and thereafter opening or closing movement of the blades about the pivot. This movable blade assembly can have inclined or camming members cooperating with the inclined shanks previously mentioned and forming part of the housing.

It has been found to be advantageous, in accordance with another feature of the invention, to provide a second piston and cylinder arrangement which can be actuated in parallel with the main cylinder by the hydraulic fluid and which can be connected to or form part of the pressing mechanism previously described. The additional cylinder and its piston can be formed with a respective restoring spring biasing the mechanism into a pressure-relieving position.

The cost of such an additional piston and cylinder unit, which can be of relatively small dimensions, is comparatively small, especially when the auxiliary cylinder communicates with the power cylinder through a passage in the housing thereof.

With all of the embodiments of the invention, it is possible to obtain a variation in the pressing force with the cutting force so that the pressing force can be less for softer workpieces than with harder workpieces and the full actuating power need not be applied when softer workpieces are to be cut.

It has been found to be advantageous to provide the camming surface concentric with the pivot axis, i.e. to use a nut threaded onto the pivot bolt as a camming member, e.g. by coupling this nut with a lever or crank displaced by the auxiliary piston. For adjustment purposes it is desirable to form the nut and the crank lever with complementary noncircular formations, e.g. teeth, so that the two can be coupled together in selected relative angular positions so that the pressing force can be selected for particular tasks.

In yet another modification of the present invention, a lever is swingable about an axis transverse to the axis of the pivot and on the latter, this lever having a camming surface acting upon the proximal blade while the reaction force is applied through the pivot bolt or pin and its head to the distal blade.

It has been found desirable, moreover, to provide the cutter with counterholders which can be subjected to the main pressure and which can grip the workpiece at at least one location on one side of the cutting plane.

The counterholders can be members subjected to a scissor action which are biased to grip the workpiece between them and hold the workpiece more or less with a precise orientation during the cutting operation. Such holders can be provided on one side or both sides of the cutting plane and can engage the piece of cable to be cut off or the remaining piece of cable from which a portion is cut.

When the or each holder comprises a pair of swingable levers, e.g. stamped sheet metal plates or the like, they can be biased into a central closed position and can define at their free ends, a wedge-shaped mouth or inlet and behind the latter, an eye-shaped retaining opening. The holder can be dimensioned so that the force developed between the members is sufficient to enable the cutter to be supported upon a high-voltage cable above the ground so that the cutter can be remotely actuated, e.g. from the ground with any personnel remote from the cutting location.

Spring means can be provided to center the holder vis-a-vis abutments on the cutter, in a central plane of the cutter not only in the cutting position but also in intermediate positions and with forces effective on each holder independent of the others. The two holder levers can be pivoted on a common axis on the cutter housing and can be biased by an angle, torque or hairpin spring. The spring can be so arranged that it is effective on each of the levers with respective shanks and generally independently of one another. Because the commom pivot can be located remote from the mouth at the rear end of the levers, the mechanical advantage is considerable and the holder can accommodate relatively thick workpieces with little variation in the holding force.

According to yet another feature of the invention, the holder levers are formed with elongated holes through which the blade pivot passes and which cooperate in generating the increased pressing force in accordance with the principles described. Thus the pressing mechanism needs few additional elements and the only increase in the cost of the cutter, when this mechanism is provided, derives from making the pivot somewhat longer so as to enable the pivot to pass through the thicknesses of the holder levers.

To the extent that the pivot must undergo displacement during the opening and closing of the blades, the rear ends of the holder levers can be formed with slots to accommodate this displacement.

It has been found to be advantageous, in practice, to increase the purchase of the holders on the workpiece by providing the mouth and eye-forming parts with flanges transverse to the plane of the lever movement, thereby increasing the security of engagement with workpieces having soft exteriors.

It has been found to be convenient, in connection with this aspect of the invention, to mount the holder or both holders (when two flank the blades) on half shells which are bolted together to clamp the parts of the main cylinder or housing together.

BRIEF DESCRIPTION OF THE DRAWING

The above and other objects, features and advantages of my present invention will become more readily apparent from the following description, reference being made to the accompanying drawing in which:

FIG. 1 is a longitudinal (axial) cross-sectional view through a cable cutter in accordance with the present invention;

FIG. 2 is a cross-section view taken along the line II—II through the pivot of the cable cutter of FIG. 1;

FIG. 3 is an elevational view of the cable cutter shown in FIGS. 1 and 2 as seen from above;

FIG. 6 is an axial cross-sectional view through a cable cutter in accordance with yet another embodiment of the invention; and FIG. 7 is a plan view of this cable cutter.

SPECIFIC DESCRIPTION

Figure 4:
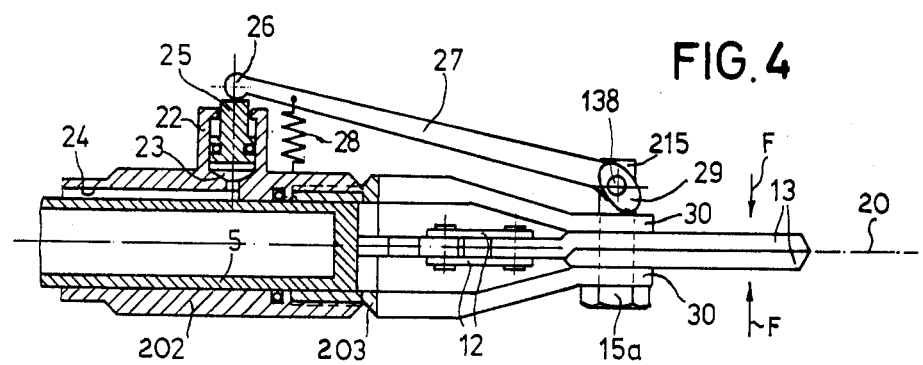
FIG. 4 is an axial cross-sectional view through the blade and the cable cutter according to another embodiment of the invention, the portions of the cable cutter not shown corresponding to those of FIGS. 1 through 3.

In the cable cutter of FIGS. 1 through 3, there is provided an actuator housing consisting of concentric and threadedly interconnected housing members 1, 2 and 3 which are also relative to one another by the sealing rings 4, 4a, 4b. More specifically, the rearward housing member 1 comprises a cylindrical body 1a terminating in a threaded boss 1b which is screwed into and internally threaded in 2a of the central housing member 2 which forms the cylinder of the actuator. The opposite end 2b of the central housing member 2 threadedly receives the externally threaded end 3a of the housing member 3 which forms the terminal portion of the cylinder and, as will be apparent hereinafter, the supports against which the mechanism for tightening the blades against one another, reacts.

The central housing member 2 is thus formed as a guide sleeve for a hollow piston 5 which receives and is acted upon by a helical tension spring 6 anchored by a screw 7 to the forward end or bottom of the piston 5 and by a hollow pin 8 to the rear end member 1 of the housing.

Thus the shaft of the piston 5 to the right will elongate the spring and generate a restoring force tending to draw the piston to the left.

The hollow pin 8 at which the spring 6 is anchored, connects via a line 9 with a source of fluid under pressure, e.g. pneumatic or hydraulic fluid, which can be a motor-driven, a foot-powered or a manually operated pump.

Beyond the hollow pin 8 which serves as the pressurized-fluid feed to the cylinder the housing member 1 can be formed with an eye or lug 10 having a throughgoing bore 11 adapted to receive a bolt or pin or a hanging cable or the like.

The line 9 can be as long as is required and is generally connected by a flexible hose to the pump, thereby facilitating manipulation of the shear and/or allowing its actuation from a location remote from the cutting edges.

Naturally, an electric motor can be provided directly in the body 1, 2, 3 of the cutter to advance the piston or a corresponding actuating member or a solenoid can be utilized for this purpose so that the cutter can be electrically controlled from a remote location. In this case, the motor can be connected by a flexible conductor with the actuator switch and the electric power source.

The forward end of piston 5 is hinged to two pairs of toggle levers 12 which are, in turn, pivotally connected to a pair of cutter blades 13.

The blades 13 lie one against the other and are pivotally connected for shear-type or scissor-type action by a pivot pin or bolt 15 onto which a nut 14 is threaded.

This pivot bolt 15 extends through a sleeve 16 provided within the housing member 13 and further is shiftable in a slot 17 in each of the arms 3b and 3c of the housing member 3 flanking the blades 13.

To accommodate the toggle levers 12 and the blades 13, both of the members 3 and 16 are slotted with the respective slot open forwardly so that the two legs or shanks defining the respective slots, like the shanks 3b and 3c, flank the blades 13, the shanks being held against outward spreading by the bolt 15 and its nut.

The inner faces 18 of the outer shanks 3b and 3c converge forwardly with a taper angle which is larger than the self-locking angle and are frustoconical (see FIG. 2).

The outer surfaces, similarly frustoconical and of wedge shape or taper of the arms or shanks 16a and 16b of the housing member 16 engage the surfaces 18 and, with a forward thrust of member 16a, 16b or a rearward movement of members 3b and 3c (to the right and left in FIG. 1 respectively) the wedge action provides a force bearing inwardly on the blade 13, i.e. an increased pressing force in the direction of arrow A in FIG. 1.

When hydraulic pressure is supplied via line 9 to the cylinder formed by the housing members 1, 2, the piston 5 is driven to the right as seen in FIGS. 1 and 3. The toggle levers 12 are spread apart forwardly (i.e. in the direction of arrows B) to rotate the blades 13 in the direction of arrow C and close the blades on a workpiece between the cutting edges 21 thereof.

Simultaneously, but before there is noticeable cutting resistance, the blades 13, the pivot 15 and the bushing 16 all move together forwardly, i.e. in the direction of arrow D, so that the wedge action described previously applies the force in the direction of arrows A which reacts against the head 15a and the knot 14 of the pivot ensuring that the two blades are pressed together, so that their cutting edges lie in the cutting plane 20. Even before the pivot 15 reaches a stop at the right hand end of the slot 17 of the housing 3, the blades 13 are swung in the direction of arrows C into the workpiece to form a clean cut therein.

When the line 9 is vented, e.g. by a conventional valve (not shown) or the fluid pressure in the cylinder 19 is otherwise relieved, the restoring force of spring 6 draws the piston 5 to the left (FIGS. 1 and 3). Since the blades 13 are initially in contact under a high-pressing force but the tapered surfaces 18 etc. do not permit self-locking, the pivot pin 15 is shifted to the left in the slots 17 which immediately reduces the pressing force and thereafter enables the toggle levers 12 to draw the blades open, counter to the direction C, when the blades are practically free of this pressing force.

The slots 17 define with the pivot bolt 15 a lost motion mechanism between the blade actuation and the pressing-force device, i.e. the tapered surfaces, which ensures relief of the pressing force prior to and not later than concurrently with the outward swinging movement of the cutting edges during the opening of the cutter.

Figure 5:
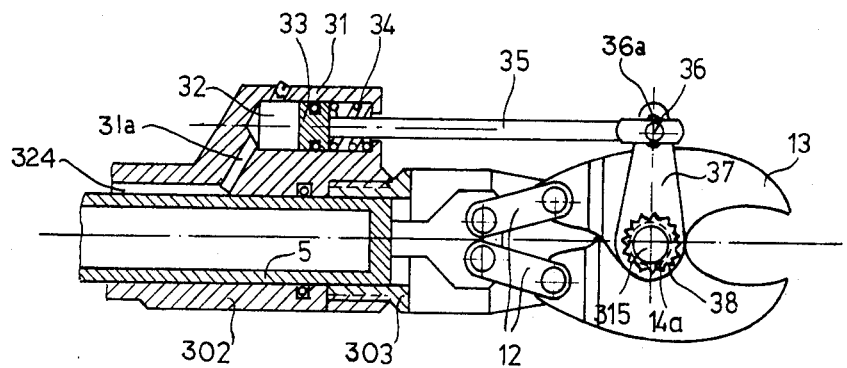
FIG. 5 is a partial section, corresponding to FIG. 4 but taken in a plan at right angles thereto through still another embodiment of a cable cutter according to the invention.

In FIGS. 4 and 5, structural elements which are equivalent to those in FIGS. 1 through 3 have corresponding reference numerals. Where these elements differ, however, they may have numerals differing from those of FIGS. 1, 2, 3 in the hundreds rank. Certain elements which have already been shown in FIGS. 1 through 3, such as the retraction spring 6 and its mountings, may retain their numerals or are omitted entirely. In these embodiments, moreover, the sleeve 16 is omitted because the pressing force is generated in a different fashion.

In the embodiment of FIG. 4, the housing part 202 is formed with a radial cylinder 22 whose cylinder member 23 communicates via an axially extending groove 24 with the cylinder chamber 29 of the housing previously described but not shown in FIG. 1, so that both the piston 5 and the piston 25 received in the cylinder 22 are pressurized simultaneously.

The piston 25 bears upon a rounded formation or nose 26 of a lever 27 which is biased in a counterclockwise sense by a restoring spring 28 tending to press the piston 25 inwardly. The lever 27 is journaled by a pivot pin 238 and a free end of the pivot bolt 215 by which the blades 13 are swingingly mounted for relative rotation so that the cutting edges lie in the plane 20.

The lever 27 carries a camming formation 29 which can be rigid or formed by a roller journaled eccentrically on the lever and which, upon rotation of the lever 27 in the clockwise sense, presses the upper shank 30 against the upper blade while the head 15a draws the lower shank 30 up against the lower blade 13 of the cutter, the shanks 30 being formed on the housing member 203 threaded into the end of the central housing portion 202.

In this embodiment, as well, the piston 5 is connected to the toggle levers 12 which are pivotally connected to the blades in the manner described in connection with FIGS. 1, 2, 3.

As soon as the cylinder 19 is pressurized, the piston 25 is forced outwardly to apply the pressing force in the direction of arrows F, this force being a function of the pressure in the housing and hence of the cutting force or resistance.

When the pressure is relieved, the spring 28 draws the lever 27 in the opposite sense to relax the pressing force and to allow the opening of the blades without noticeable resistance.

In FIG. 5 the housing member 302 carries an axially extending (longitudinal) cylinder 31 connected by a passage 31a with the longitudinal groove 324 communicating with the cylinder chamber 19 (FIG. 1) in the manner described in connection with FIG. 4.

The cylinder 31 slidably receives a piston 33 which is biased to the left by a compression-type restoring coil spring 34 received in this cylinder. A piston rod 35 connects the piston 33 to a crank lever 37 via a pilot linkage 36 which can be slidable in a groove 36a of the lever 37 and can have a slide block (not shown) shiftable in this groove.

The lever 37 fits over a star wheel or externally toothed gear 38 which is threaded onto the end of the pivot bolt of the nut 14a designed to tighten the pivot bolt and thereby providing an increased pressing force as the lever 37 is swung in the tightening direction, i.e. clockwise, the head of the bolt being anchored in the housing member 303 against rotation.

In the present case, the pressing force and its relief, perpendicular to the plane of the paper in FIG. 5, result exclusively by tightening and releasing the knot 14a prior to beginning the cutting stroke and the opening stroke, respectively. Since the lever 37 has a complementary configuration to the external toothing of member 38, the pressing force can be adjusted by varying the relative angular positions of the members 37 and 38 and then fitting the two together. In this embodiment as well, since the fluid pressure applied to the piston 5 is communicated to the chamber 32, the pressing force is always a function of the cutting force.

Certain variants of the embodiments shown in FIGS. 4 and 5 can also be considered within the ambit of the present invention. For example, in the communication between the pressing-force cylinder and the main cylinder chamber 19, a controllable pressure-relief valve can be provided so that the cylinders 23 and 32 can be pressurized first and the pressure communicated to the main cylinder only after the pressure buildup has reached the magnitude determined by the setting of this valve. In this case, the cutting operation is delayed until the pressing force has been sufficiently built up and, conversely, the pressure in the cylinders 23 and 32 can be relieved to remove the pressing force prior to the commencement of the opening operation. In this case, of course, the main fluid-pressure inlet can be provided on the cylinders 23 and 32 rather than at the main cylinder 19.

Other modifications including or apart from the latter variant can also be contemplated. For instance, instead of a nut 14a, a cylinder can be provided directly in line with the pivot bolt 15 and can be connected to the latter by a lost motion linkage functioning similarly to the slots 17 for applying the pressing force prior to the commencement of the cutting operation and relieving the pressing force prior to the opening operation.

FIG. 6 shows a cable cutter in which the tubular housing members 102, 103 are held together by a clamping fitting of two shell halves engaging the flanged ends 102a, 103a of the housing and retaining them in axially aligned sealed relation via the seals 104, 104a.

The blades 113 lie upon one another and are pivotally connected by a bolt 115 onto which a pair of nuts 114 are threaded.

In the region of the pivot, there are provided two separate flat wedges 116 having wedge surfaces 118 forming a wedge angle of 14° with the cutting plane 120, these wedges extending along the longitudinal slots 117 in the shanks 103b and 103c whose ends 122 flank the blades.

The free ends 122 of these shanks are reinforced by beads and on one side an intermediate ring 123 surrounds the bolt 115 and is overlain by a pair of bow-shaped holders 124 with transversely extending longitudinal slots such as have been shown at 142 in FIG. 7. The members 124 are disposed mirror-symmetrically with respect to a plane 124 perpendicular to the plane 137 and referred to hereinafter as the plane of insertion of the workpiece or the workpiece insertion plane. To apply the pressing force, one of the nuts 114 bears upon a washer 125.

Members 124 are steel-sheet stampings in the form of swingable levers which have, at their rear ends, longitudinal slots 126 transversed by a bolt or pin 127 and held in place by a C-clamp, cutter pin or the like. The pin 127 is formed on one of the shell halves 128, the latter being connected to the other shell half 129 by screws or rivets 130 thereby forming the coupling 101 which holds the two members 102, 103 together. Naturally, a second set of members 124 can be provided on the underside of the device shown in FIG. 6 with pivotal connections to the other shell half 129.

A hairpin-type torsion spring 132, extending around a boss formed on or a groove formed in the shell half 128, has ends 133 engaging over the outer edges of the members 124 to swing them inwardly toward one another. In the closed position shown in FIG. 7, the rear end portions of these levers overlap and register fully as can be seen from this figure and one end of each slot 142 rests against the pin or bolt 115.

In the closed position of the holder, the free ends form a wedge-shaped inlet opening 134 or mouth which is symmetrical to the median plane of the blades 113. The mouth 134 terminates at a stop 135 at which two bulges come together, beyond the stop 135, a lens-shaped eye 136 being formed. The latter is a holding opening adapted to receive the workpiece, for example an electrical cable 137, when the cable 137 is to be cut, the cutter is forced over the cable in the direction of arrow G, the mouth 134 leading the cutting edges 120 of the blades. The members 124 are spread apart as the cable is forced past the stop 135 against the force of spring 132. The cable then passes into the eye 136 behind the stop 135 whereupon the cable lies in the path of the blades 121.

The spring 132 is dimensioned so that it applies a closing force sufficient to retain the cable cutter on the cable and allow the remote pressurization thereof without any personnel in the vicinity.

The mouth, stop and eye forming portions of the holders 124 are provided with flanges 138 which serve to widen the area of engagement of the cable and improve the lie of the cutter at right angles to the cable.

The spring 132 can engage an abutment which tends to center the holding levers 124 or with separate abutments acting upon the spring shanks. Once the workpiece is gripped by the holder and the cutter is oriented properly with respect to the workpiece, the cutting plane lies perpendicular to the longitudinal dimension of the workpiece. The cylinder 119 is thereupon pressurized through line 109 with the hydraulic fluid to drive the piston 105 to the right against the force of spring 106.

The toggle levers 112 are spread apart as the piston moves in the direction of arrow G until the cutting blades engage the workpiece.

Simultaneously and before there is a significant increase in the cutting resistance, the blades 113 and the pivot 115 are shifted in the direction of arrow G relative to the housing so that wedge-shaped washers 116 are likewise carried in this direction and, by riding on the flanks 118, cam the blades 113 toward one another, i.e. generate the pressing force. The reaction force is, of course, taken up by the nuts 114.

The pressing force is increased until the pivot bolt 115 reaches the right-hand end of the respective slot 117. Advantageously the mechanism is dimensioned so that the inward swinging of the cutting edges 121 commences even before the bolt 115 reaches the abutment. As a result, the pressing force during the cutting operation is proportioned to the pressing force and, since the holder retains the cutter in the desired position perpendicular to the cable, a particularly smooth cut is obtained.

When the hydraulic pressure is relieved (by conventional valve means not shown) the restoring force of the spring 106 draws the piston 105 to the left. The wedge structure is not self-blocking so that members 116, bolt 115 and blades 113 are drawn to the left to relieve the pressing force between the blades, the toggle levers thereupon spreading the blades apart. The force of spring 132 remains effective even after the cut so that the unit can remain suspended from a hanging portion of the cable and the unit can be recovered therefrom as is convenient. Of course the holder can be provided so that it retains the short cable end or can fall together with the cut off portion of the cable.

Naturally, a second holder can be provided on the bottom of the embodiment shown in FIG. 6, symmetrical with the holder 124 etc. which has been illustrated.

I claim:

1. A shear-type cutting tool, especially a cable cutter, comprising:

a housing;

an actuator shiftable in said housing;

a pair of blades connected to said housing and defining a pivot axis for at least one of said blades with said blades lying against one another and having cutting edges performing a shearing action upon angular displacement of said one of said blades about said axis whereupon motion of at least one cutting edge defines a cutting plane substantially transverse to said pivot axis;

means operatively connecting said actuator to said one of said blades for displacing same; and a mechanism responsive to the operation of said actuator for applying a pressing force to said blades generally in the direction of said axis and dimensioned in accordance with cutting resistance encountered by said blades while relieving said pressing force upon opening of said blades.

2. The tool defined in claim 1 wherein said mechanism includes a camming surface disposed in the region of said pivot axis and acting upon said blades.

3. The tool defined in claim 2 wherein said mechanism includes a member displaceable by said actuator and operatively connected to said camming surface for displacing same relative to said housing, thereby generating said pressing force.

4. The tool defined in claim 2 wherein said camming surface is provided on said housing, further comprising a member complementary to said surface and connected to a pivot defining said axis for urging said blades together upon displacement of said blades by said actuator.

5. The tool defined in claim 2 wherein said surface is a wedge.

6. The tool defined in claim 2 wherein said housing includes a member traversed by a pivot defining said axis and formed with a slot extending in the direction of displacement of said actuator and forming a lost-motion connection with said pivot whereby said pressing force is generated prior to closure of said blades and is relieved prior to opening of said blades.

7. The tool defined in claim 2 wherein said actuator is a hydraulic piston operatively connected to a restoring spring and displaceable in a main cylinder formed by said housing.

8. The tool defined in claim 7, further comprising a secondary cylinder operable by a pressurizable fluid in parallel and receiving an auxiliary piston connected to said surface.

9. The tool defined in claim 8 wherein said auxiliary piston is operatively connected to a lever engaging a nut threaded onto a bolt forming a pivot defining said axis.

10. The tool defined in claim 9 wherein said nut and said lever are provided with mating toothed formations enabling relative angular adjustment of said nut and said lever.

11. The tool defined in claim 8 wherein said secondary piston is connected to a lever swingable on a pivot bolt defining said axis and having a camming surface generating said pressing force.

12. The tool defined in claim 2 wherein said housing comprises a pair of shanks flanking said blades and formed with an opening traversed by a bolt defining said axis, said actuator formed as a piston connected to said blades by respective toggle levers.

13. The tool defined in claim 12, further comprising a holder pivotally connected to said housing and extending forwardly of said blades and including two members deflectable to receive a workpiece for positioning said workpiece relative to said blades.

14. The tool defined in claim 13, wherein said members are formed with openings traversed by said bolt, said members being stamped sheet metal elements defining in a closed position of said holder a V-shaped mouth and rearwardly thereof a generally elliptical eye, a spring urging said mouth closed and resisting springing of said members at said mouth.

15. The tool defined in claim 13 wherein said holder comprises two holder levers swingable parallel to the cutting plane.

16. The plane defined in claim 15, further comprising a spring biasing said levers into a central position on said housing, said levers having free ends for defining a V-shaped inlet mouth.

17. The tool defined in claim 16 wherein said levers are formed, rearwardly of said mouth, with mutually engaging bulges constituting a stop and urged apart upon insertion of a workpiece through said mouth.

18. The tool defined in claim 17 wherein said levers are swingably mounted on said housing on a common pin and are formed with slots traversed by a bolt forming said axis, said free ends of said levers being formed with flanges perpendicular to the cutting plane for increasing the purchase of the holder on the workpiece.

19. The tool defined in claim 18 wherein two such holders are provided on opposite sides of said blades.

20. The tool defined in claim 18 wherein said pin is formed on a half shell of a pair of half shells constituting a connector retaining parts of said housing together.

* * * * *